June 15, 1965

C. HOLLERITH 3,188,951

MAGNETIC CHASE WITH RELATIVE MOVEMENT BETWEEN MAGNETS AND PLATE SUPPORTING SURFACE

Filed Aug. 29, 1961

4 Sheets-Sheet 1

INVENTOR

CHARLES HOLLERITH

BY Beaman & Beaman

ATTORNEY

June 15, 1965 C. HOLLERITH 3,188,951

MAGNETIC CHASE WITH RELATIVE MOVEMENT BETWEEN MAGNETS AND PLATE SUPPORTING SURFACE

Filed Aug. 29, 1961

4 Sheets-Sheet 2

INVENTOR
CHARLES HOLLERITH

BY Beaman & Beaman
ATTORNEY

June 15, 1965 C. HOLLERITH 3,188,951

MAGNETIC CHASE WITH RELATIVE MOVEMENT BETWEEN MAGNETS AND PLATE SUPPORTING SURFACE

Filed Aug. 29, 1961

4 Sheets-Sheet 3

INVENTOR
CHARLES HOLLERITH

BY Beaman & Beaman
ATTORNEY

June 15, 1965 C. HOLLERITH 3,188,951

MAGNETIC CHASE WITH RELATIVE MOVEMENT BETWEEN MAGNETS AND PLATE SUPPORTING SURFACE

Filed Aug. 29, 1961

4 Sheets-Sheet 4

INVENTOR
CHARLES HOLLERITH

BY Beaman & Beaman
ATTORNEY

United States Patent Office 3,188,951

Patented June 15, 1965

3,188,951

MAGNETIC CHASE WITH RELATIVE MOVEMENT BETWEEN MAGNETS AND PLATE SUPPORTING SURFACE

Charles Hollerith, Jackson, Mich., assignor to Magnachase Corporation, Jackson, Mich., a corporation of Michigan Filed Aug. 29, 1961, Ser. No. 134,635
10 Claims. (Cl. 101—382)

Figure 1:
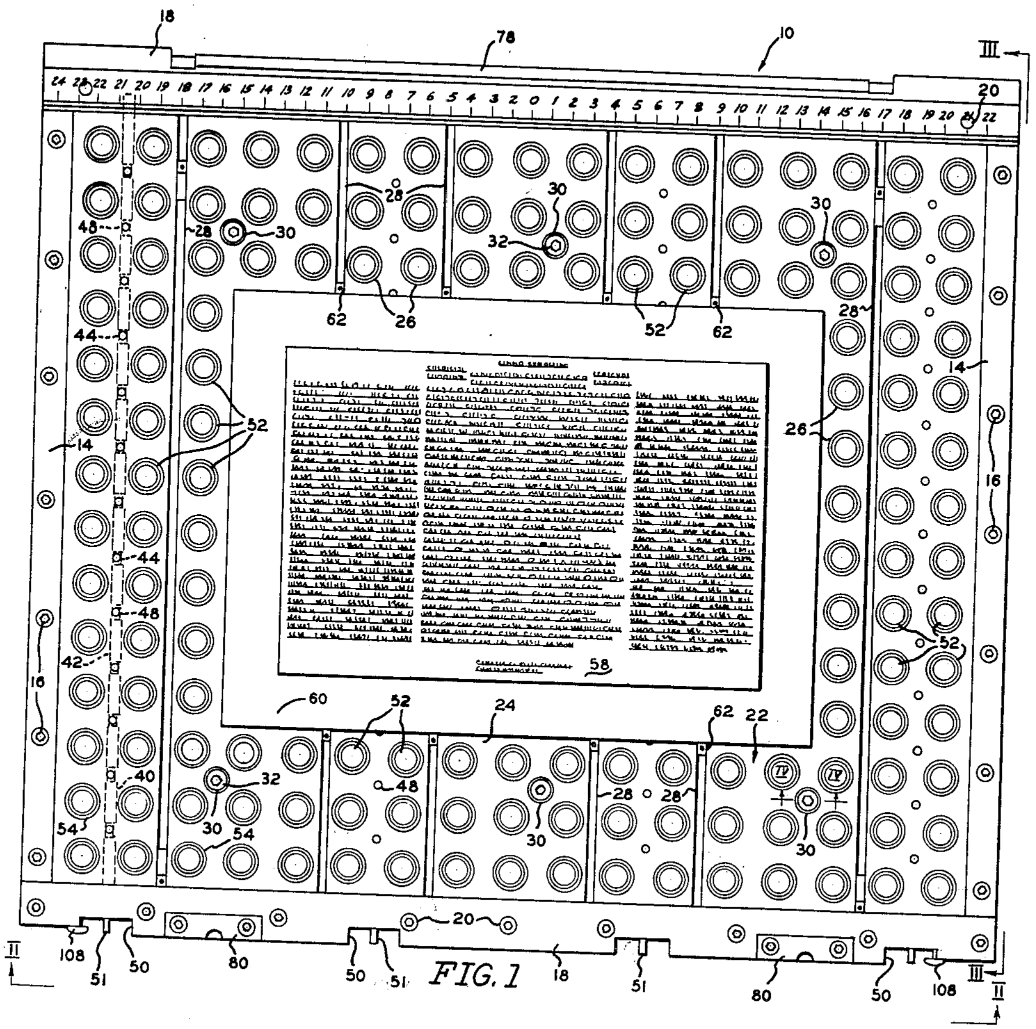

The invention pertains to type mounting and holding apparatus for printing devices and particularly relates to type holding devices employing magnetic forces to maintain the type element in engagement with the type support means.

It is conventional with printing apparatus such as letter presses and the like to employ a chase to hold the type members in the desired position upon the press bed. Usually, the chase is removably mounted upon the printing machine and comprises a rectangular frame between which the type elements are located and maintained by means of a plurality of shims, wedges, and compression locking means. Such conventional chase structure is difficult to use and requires extraordinary skill on the part of the operator to accurately position and relate the type elements to the chase. Also, each time the type is changed or repositioned, the type elements often must be at least partially disassembled on the chase and reassembled, which is a time consuming and expensive operation.

Wherein the conventional typesetting apparatus usually employs the type lines produced by a Linotype machine which are blocked into the chase, new processes for forming type are being developed and are available wherein the type necessary for printing a complete sheet, page or form may be formed upon a single type plate, the type being integral with the plate and arising from the surface thereof such that upon contacting a sheet of paper with the plate the desired imprint results. Such type forming processes, among other names, are commonly known as deep etched plate processes and similar processes known as powderless etching are also available. Such type plates may be made of metal or plastic and have the advantage of rapidly producing type in an accurate and permanent form, one advantage being that the entire plate may be stored or filed and may be employed at later times by merely mounting the same upon the chase without necessitating the resetting of type.

In the use of the deep etched and powderless etched type plate elements with conventional chases and type holding members, it has been common to cement the type plate element upon a wooden block and lock the block into the chase using the conventional shims, wedges and locking apparatus. Thus, while the deep and powderless etched plates overcome many of the disadvantages of the older type forms, the full advantage of these new type forming processes is not realized due to the antiquated holding apparatus heretofore employed with letter presses and the like.

It is, therefore, an object of the invention to provide improved type element holding means which, though not limited to, is particularly adapted to being employed with deep etched type plates and powderless etched plates wherein the full cost and time saving advantages of these type forming processes may be realized.

Another object of the invention is to provide a type element mounting device having a type element supporting surface wherein magnetic force means are employed to hold the type element upon the supporting surface.

A further object of the invention is to provide a printing press chase having a supporting surface and magnets associated therewith wherein means are provided for relatively displacing the supporting surface and the magnets.

Another object of the invention is to provide printing press type holding means having a supporting surface and employing magnets to maintain a type element upon the supporting surface wherein the supporting surface is lifted relative to the magnets to release the type element from the magnetic force.

A further object of the invention is to provide a magnetic chase for printing apparatus having a supporting surface and magnets associated therewith wherein means are provided for raising and lowering the magnets relative to the supporting surface.

Yet another object of the invention is to provide a magnetic chase for mounting magnetic type elements upon printing apparatus wherein the chase includes a supporting surface upon which the type element is supported and magnetic force maintains engagement of the type element upon the surface and positioning means are associated with the surface engaging the type element to prevent shifting of the type element upon the chase surface.

A further object of the invention is to provide a chase for printing apparatus employing a support member having a support surface in which a plurality of magnet elements are mounted and means are provided for selectively controlling the operative effect of the magnets to maintain type elements upon the surface operative at selected positions upon the chase wherein portions of the chase may be rendered inoperative and permit the type element to be removed therefrom.

Yet another object of the invention is to provide a magnetic chase for printing book signatures wherein each page of the signature is mounted upon an individual unitary type element and is maintained upon the chase by magnetic force, and key means are associated with the chase and the individual type elements insuring proper location of the elements upon the chase.

Figures 2, 4:
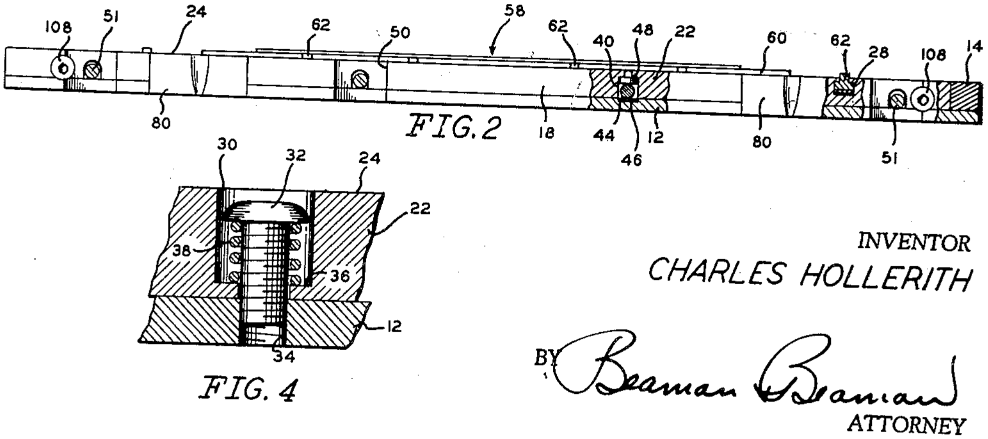
Figure 3:
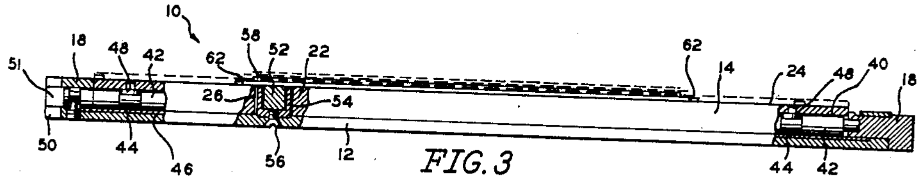
Figure 5:
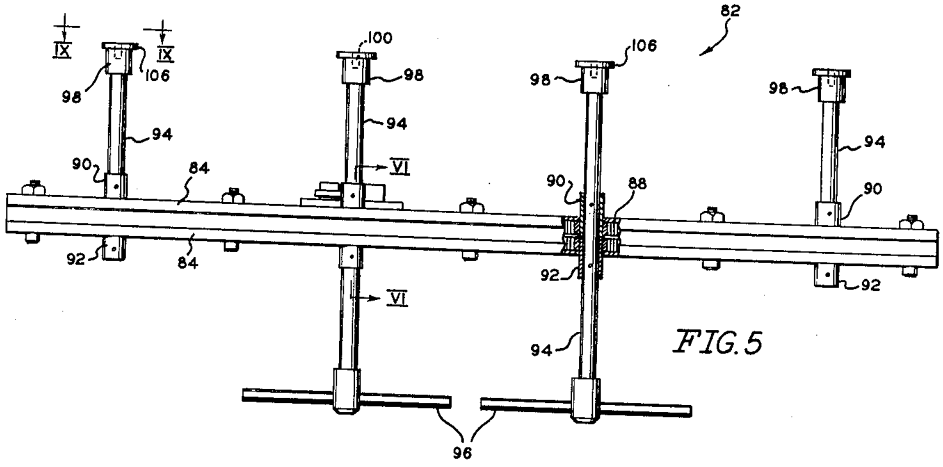
Figures 6, 7, 8, 9, 10:
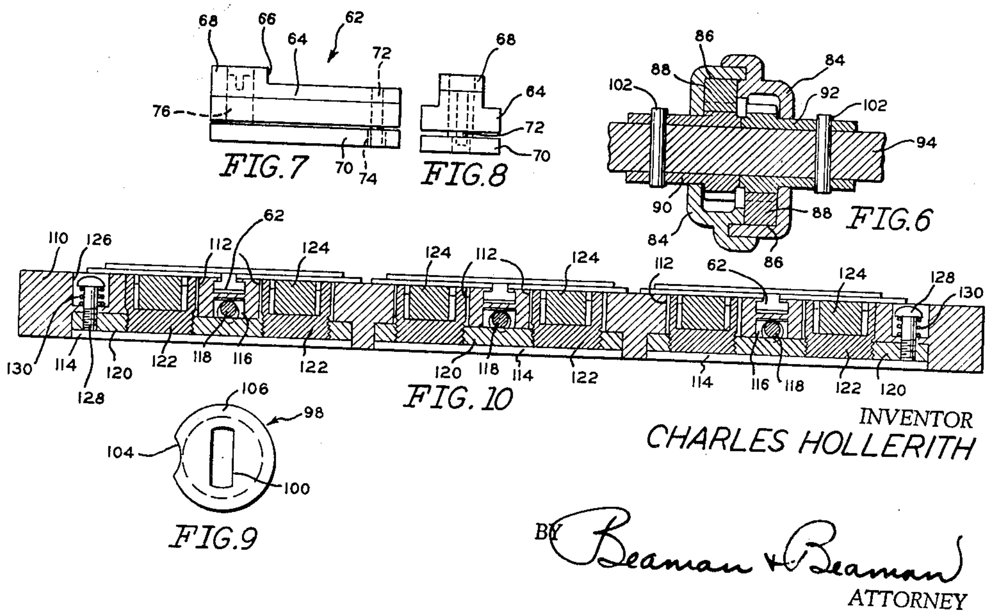
Figure 11:
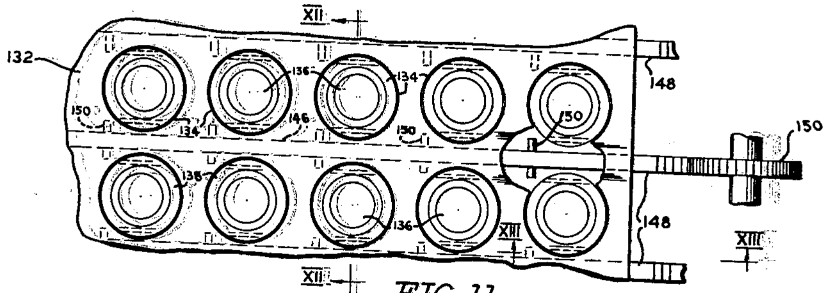
Figure 12:
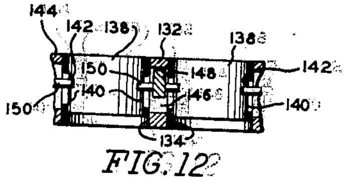
Figure 13:
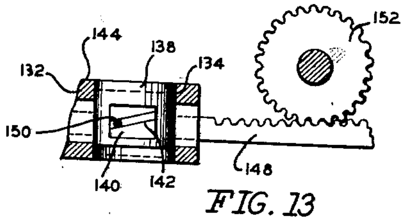
Figure 14:
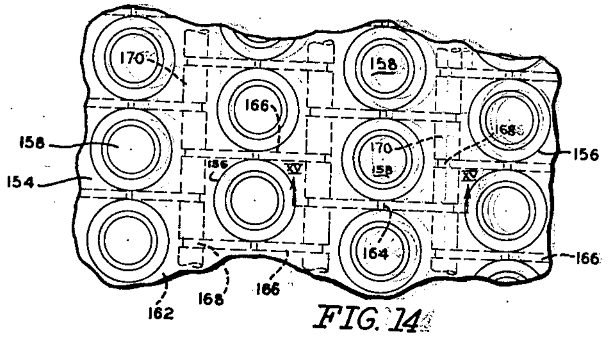
Figure 15:
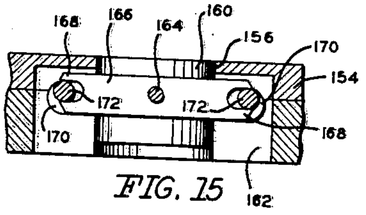
Figure 16:
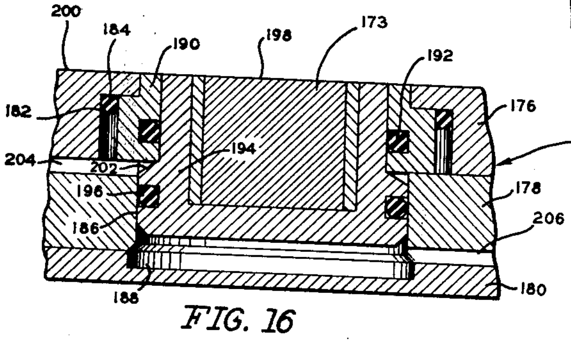
Figures 17, 18, 19, 20, 21:
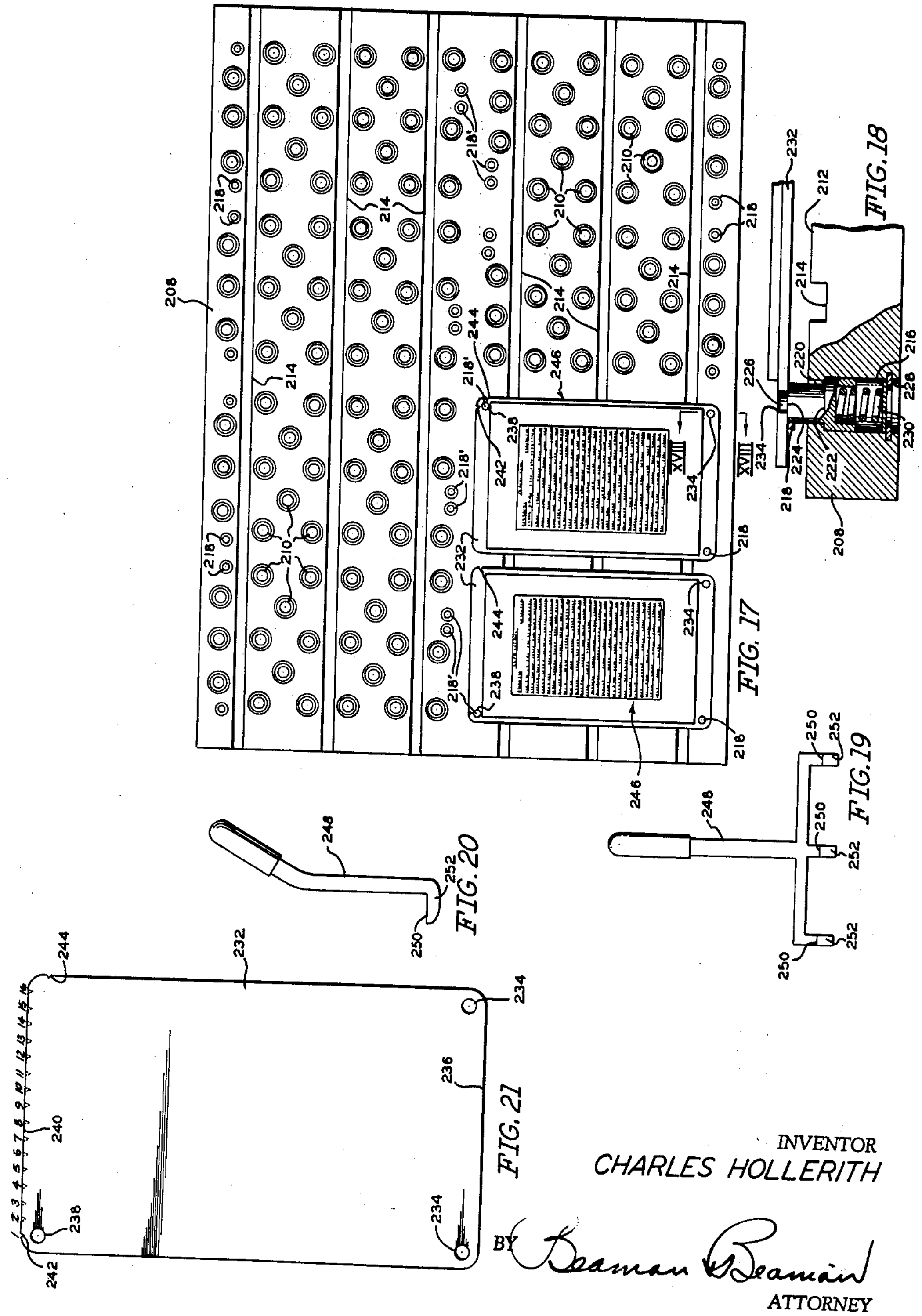

These and other objects of the invention arising from the details and relationships of the components of embodiments thereof will be apparent from the following description and accompanying drawings wherein:

FIG. 1 is a plan view of a magnetic printing press chase in accord with the invention having a type mounting element centrally located thereon, FIG. 2 is an elevational, partly sectioned, end view of the chase of FIG. 1 taken along section II—II thereof, FIG. 3 is an elevational side view, partly sectioned, of the chase embodiment of FIG. 1 taken along section III—III thereof, FIG. 4 is an elevational, enlarged, sectional view of the means biasing the support plate downwardly as taken along section IV—IV of FIG. 1, FIG. 5 is a plan view, partly in section, of the cam actuating means for the embodiment of FIG. 1, FIG. 6 is an elevational, sectional, detail view of the cam actuating means taken along section VI—VI of FIG. 5, FIGS. 7 and 8 are enlarged detail side and end views, respectively, of the type element positioning means employed with the chase of FIG. 1, the locking plate being shown in the down position in FIG. 8, FIG. 9 is an enlarged detail of the cam actuating head taken along section IX—IX of FIG. 5, FIG. 10 is an elevational, sectional, view of another embodiment of the invention wherein the support plate is stationary and the magnets move relative to the plate, FIG. 11 is a plan, detail view of another embodiment of the invention wherein the magnet members are mounted for independent movement relative to the support plate and employ an inclined cam surface, FIG. 12 is an enlarged, detail, sectional, view taken along XII—XII of FIG. 11, FIG. 13 is an enlarged, detail, sectional, view taken along XIII—XIII of FIG. 11, FIG. 14 is a plan, detail view of another embodiment of the invention wherein the magnets are actuated independent of the support plate, FIG. 15 is an elevational, sectional, view of the embodiment of FIG. 14 taken along section XV—XV thereof, FIG. 16 is an elevational, sectional, detailed view of another embodiment of the invention wherein the magnet members are individually pneumatically or fluid actuated, FIG. 17 is a plan view of another embodiment of the invention adapted for use with the printing of book signatures illustrating two type mounting elements in position thereon, FIG. 18 is an enlarged, detail, elevational, sectional, view of the type element lifting and key means employed with the embodiment of FIG. 17 taken along section XVIII—XVIII, FIGS. 19 and 20 are front and side views, respectively, of a tool which may be used in conjunction with the chase of FIG. 17 for lifting the type elements from the field of magnetic attraction, and FIG. 21 is a plan view of a type element backing plate which may be used with the chase of FIG. 17.

Basically, the invention comprises a supporting surface adapted to support a magnetic type mounting element wherein magnetic means are associated with the support surface to maintain the type mounting element in firm, direct, engagement therewith. The supporting surface may, within the scope of the invention, be defined directly upon the bed of the printing press, but preferably is defined upon a plate comprising a component of a chase which may be removably mounted on the press. In the illustrated embodiments, the invention is disclosed as employed in conjunction with a chase of planar configuration. However, it will be appreciated that the invention may also be employed with cylindrical type mounting members such as used with rotary presses.

Referring to FIGS. 1 through 4, one embodiment of the invention will now be described. The embodiment disclosed in FIGS. 1 through 4 is in the form of a chase 10 which includes a planar bottom plate 12 of rectangular configuration defining the overall area of the chase. A pair of rectangular lateral side rails 14 are bolted to the plate 10 by bolts 16 and a pair of rectangular rails 18 extending adjacent the ends of the plate are affixed to the plate 10 by means of bolts 20. Thus, it will be appreciated the plate 10 and the rails 14 and 18 define a rectangular recess. A type element support plate 22 is received within this recess in close sliding relation with the rails 14 and 18, and is provided with planar support surface 24 defined thereon.

The support plate 22 is provided with a plurality of cylindrical holes 26 evenly distributed about the entire area of the support plate. The holes 26 extend completely through the support plate and, thus, intersect the support surface 24. Also, the support plate is provided with a plurality of T-grooves 28 extending across the plate in parallel relation as will be apparent from FIG. 1. At several evenly spaced locations upon the support plate 22 a bore 30 is defined therein, FIG. 4, for receiving a screw 32 which is threaded into a tapped hole 34 defined in the bottom plate 12. The bore 30 is shouldered at 36 wherein a compression spring 38 interposed between the head of screw 32 and the shoulder 36 tends to bias the support plate 22 toward the bottom plate 12.

The lower side of the support plate 22 is provided with four parallel, spaced, grooves 40 extending the length of the support plate. The grooves 40 are for the purpose of receiving cam shafts 42 which are of substantially cylindrical configuration having eccentric crank portions 44 evenly disposed along their length, FIG. 3. One cam shaft length is illustrated in dotted lines in FIG. 1. The bottom plate 12 is grooved to receive a bearing wear strip 46 which engages the cam shaft noneccentric portions and bearing wear buttons 48 are provided in the upper portion of the grooves 40 for engagement with the eccentric crank portions 44. One end of the cam shafts 42 is journaled in a rail 18, as shown at the right of FIG. 3. The other ends of the cam shafts are journaled in the other rail 18 and extend into notched recesses 50 defined in the rail. It will, therefore, be appreciated that upon rotation of the cam shafts 42 by means engaging the ends 51 of the cam shafts, which are provided with opposed flats, the support plate 22 may be raised relative to the bottom plate 12. Upon raising the support plate 22, the sliding engagement with rails 14 and 18 will guide the movement of the support plate and such action will also compress the springs 38.

Permanent magnets are received within the holes 26 defined in the support plate 22. The magnets are preferably of the pot magnet type having an Alnico magnet 52 having upper and lower poles, FIG. 3, mounted within a jacket 54 engaged by the lower pole. The jacket 54 is of a magnetic material and receives the magnet within a recess whereby the vertical walls of the jacket are spaced from the magnet and the upper edge of the walls define a surface coplanar with the upper magnet pole end. Jacket 54 is slidably closely received within the holes 26 and a screw 56 extending up through the bottom of the plate 12 into the jacket firmly affixes the magnets to the bottom plate 12. The upper surface of the jacket 54 and magnet 52 is substantially aligned with the support surface 24 when the support plate is in its downward position, as shown in FIGS. 2 and 3. Thus, it will be appreciated that upon rotating the cam shafts 42 and lifting the support plate 22, that the support surface 24 will be lifted above the surface of the magnets as shown in dotted lines in FIG. 3.

The type mounting element is shown at 58 and consists of a plate having type formed thereon such as by the deep etch, powderless etch or similar processes. Such type is usually formed on a nonmagnetic material such as zinc, or upon a plastic, and to render the type mounting element magnetic a steel plate 60, FIG. 2 is cemented to the bottom of the type forming plate wherein the type mounting element may be held in intimate engagement with the support surface 24 by the magnets 52 when the support surface is in the full down position as shown in FIG. 2.

To positively prevent the type mounting element from shifting on the chase during operation of the printing press, a plurality of positioning abutment members 62 are located within the T-grooves 28 and abut against the edges of the type mounting element 58. The abutment elements take the form shown in FIGS. 7 and 8 and include shoe members 64 of T-configuration having a shoulder 66 defined thereon, and the projection 68, defining the shoulder surface 66, extends above the support surface 24 but terminates at a point lower than that of the type surface as not to interfere with the operation of the printing. A locking plate 70 of similar plan configuration as the shoe 64 is associated therewith and is provided with a hole 74 which slidably cooperates with a pin 72 mounted in and extending below shoe 64. Thus, the plate 70 can be moved up or down with respect to the shoe member 64; FIG. 8 illustrates a down position. The shoe member is provided with a threaded hole in which a set screw 76 is provided which bears upon the plate 70. In operation the abutment members 62 are slidably located within the T-grooves 28, two abutment members in opposed relation being mounted in each groove, as shown in FIG. 1. The set screws 76 are backed off from the plates 70 wherein the shoe members may be readily slidably positioned within the T-grooves such that the shoulder 66 engages the edge of the type mounting element 58. Thereupon, tightening of the set screw 76 forces the plate 70 into engagement with the bottom of the T-groove 28 and, thus, locks the shoe member relative to the support plate 22.

The chase is mounted in the printing press by conventional press mounting means which cooperate with the surface 78 formed in an end rail 18 and the mounting brackets 80 attached to the opposite rail member 18. In this manner the T-grooves 28 are related to the printing press in a direction parallel to the forces imposed upon the type mounting element by the inking apparatus and, thus, the abutment members, in combination with the high frictional engagement between the type mounting element and the surface 24 due to the connection created by the magnets, will prevent shifting of the type element relative to the chase.

During initially locating a type mounting element 58 upon the chase or removing the type element therefrom, it is, of course, desirable that the magnetic attraction force acting upon the type element be released. Releasing or minimizing the magnetic attraction of the type element against the support surface 24 is accomplished by raising the support plate 22 and surface thereof relative to the magnets by operation of the cam shafts 42. In the embodiment shown in FIGS. 1 through 4, it is desirable that the entire support plate 22 be simultaneously raised due to its integral construction, and for this purpose a cam shaft actuating tool 82 as shown in FIGS. 5 and 6 is employed to simultaneously rotate the cam shafts 42.

The cam shaft actuating tool 82 may include a pair of extrusion molded interlocked members 84 defining guideways 86 for slidably receiving rack members 88. At four spaced locations along the members 84, at intervals corresponding to the distances separating the cam shafts, a pair of axially aligned gears 90 and 92 are rotatably mounted which include extended hub portions which extend outwardly from the confines of the members 84. The racks 88 extend substantially the entire length of the members 84 and one rack meshes with each of the gears 90 while the other rack meshes with each of the gears 92. Shafts 94 extend through the hubs of the gears 90 and 92, and the center two shafts are provided with handles 96 affixed thereto. All of the shafts 94 are provided with a chuck or wrench head 98 having an elongated recess 100 therein adapted to be matingly engaged with the cam shaft ends 51 which are of a complementary configuration. It is, of course, necessary that all of the cam shafts be in a common position at one time to insure uniform raising and lowering of the support plate 22, and to this end the recesses 100 within all of the chuck heads 98 must be identically oriented. During assembly of the actuator 82 such orientation may be simplified by first inserting the shafts 94 through the gear hubs and aligning the recesses 100. Thereupon, diametrical holes may be drilled in the hubs and shafts for receiving the pins 102 and, thus, simplified means are produced for orienting the recesses of all of the shafts and simplifying the assembly of the cam shaft actuator.

To minimize the possibility of the operator starting the printing press when the support plate 22 is in its up position, remote from the magnet surfaces, notches 104 are defined in the rims 106 of the end clutch heads 98 which permit the clutch heads to be slipped past the heads of screws 108, FIG. 1, only when the support plate is in its down position. Thus, the operator cannot remove the cam shaft actuator from the ends 51 of the cam shafts unless the support plate is in its down position, and due to the size of the actuator 82, it is unlikely that the operator will start the press while the actuator is connected to the chase.

In operation, the chase will be mounted in the printing press with the mounting means of the printing press operatively engaging the notch 78 and the mounting clamp portions 80. The operator will then place the cam shaft actuator 82 in substantially the same plane with the chase and slip the clutch heads 98 over the ends 51 of the cam shafts after aligning notches 104 with the screw heads 108. The operator will then rotate the handles 96 and shafts 94 to rotate the cam shafts 42 causing the eccentrics thereof to engage the bearing buttons 48 and lift the support plate 22 relative to the plate 12. The operator then places the type mounting element upon the support surface 24 and positions the element thereon as desired. Once the desired location of the type mounting element on the support surface 24 is achieved the abutment members 62 may be moved in the T-grooves 28 until the shoulders 66 engage the edges of the element and tightening of the screws 76 lock abutment members within the grooves. Upon the rotation of the actuator handles 96 in the desired direction, the cam shafts 42 will be rotated to lower the support plate upon the bottom plate 12 whereupon the pole surface of the magnet members 52 substantially aligns with the support 24 and the magnetic force upon the type element will tightly draw the type element into engagement with the support plate surface. Upon fully lowering the support plate the notches 104 of cam shaft actuator clutch heads will align with the heads of the screws 108 and permit the actuator to be removed from the cam shaft ends 51. The printing press is now ready for operation. If desired, the locating and locking of the abutment members 62 may be deferred until the support plate has been lowered and the magnetic attraction of the type mounting element occurs.

To remove the type mounting element from the chase, or reposition the type element thereon, the operator merely places the cam shaft actuator upon the cam shaft ends 51 and rotates the handles 96 and cam shafts to lift the support plate 22 and type mounting element relative to the magnets. The type mounting element may then be lifted directly from the surface 24 or if it is desired to shift the location of the type mounting element on the chase, the abutments 62 will be loosened and backed away from the type mounting element to permit adjustment of the same.

It will be appreciated that it is within the scope of the invention to form the support plate shown in FIG. 1 in two equal size portions, each portion containing two cam shafts wherein the actuation of two cam shafts will raise and lower one-half of the support plate. Such a construction would be of advantage wherein a plurality of type mounting elements are mounted upon the chase at a given time; however, only those elements on one-half of the chase are to be mounted, removed or repositioned at a time.

Another embodiment of the invention is shown in FIG. 10 wherein a construction is shown such that the magnets may be moved relative to the support plate, rather than moving the support plate relative to the magnets, as with the embodiment of FIGS. 1 through 4. In FIG. 10 a support plate 110 is provided with a plurality of holes 112 mounted thereon in a regular and preferably, evenly spaced, arrangement. The plate 110 is provided with a plurality of recesses 114 on the underside thereof and the plate is recessed at 116 in a longitudinal direction to receive the cam shafts 118 which are similar in configuration to those of the aforedescribed embodiment. T-grooves are formed in the support plate for receiving abutments of the type described above.

A magnet supporting plate 120 is mounted within each of the recesses 114 for slidable movement thereto in a vertical direction as illustrated in FIG. 10. Each of the plates 120 is provided with a number of threaded holes into which the jacket 122 of magnet members 124 are threaded as to become a part of the plates 120. A number of holes 126 are formed in the support plate 110, two of which are illustrated in FIG. 10, for receiving bolts 128 which are affixed to the plates 120 and have a spring 130 interposed between the bolt head and the lower surface of the hole to bias the plates 120 in an upward direction, as shown in the drawing. In the normal or operative position of the magnets the relationship will be as in FIG. 10 wherein the pole surface of the magnets is substantially aligned with the upper surface of the support plate upon which the type mounting element rests.

Where it is desired to lower the magnets associated with a common plate 120, the cam shaft engaging the plate is rotated by any suitable actuating means, not shown, such as a hand operated knob on the end of the cam shafts. Such action will force the plate 120 downwardly, compressing all of the springs 130 associated with that plate, and withdraw the magnet pole surfaces from the support plate surface. In the illustrated embodiment three different plates and groups of magnets are illustrated as comprising the chase and, thus, the actuation of a single cam shaft will operate one-third of the magnets of the chase. The embodiment of FIG. 10 is of particular advantage wherein a number of small type elements are associated with a chase and it is desired to only mount, remove or relocate specific type elements without disturbing the remaining type elements.

In the embodiment of FIGS. 11 through 13, other means for raising and lowering the magnet members relative to the support plate are illustrated. In this embodiment the support plate 132 is provided with a plurality of holes 134 in which magnet members 136 encased within a jacket 138 are slidably received. The magnet member jackets 138 are provided with slots or grooves 140 on diametrically opposite sides and each of the grooves is provided with a cam groove 142 which is inclined with respect to the support plate surface 144.

The support plate 132 is provided with passageways 146 which extend therethrough intermediate adjacent rows of the holes 134, and an actuating rod 148 is slidably received within each of the passages 146. The actuating rods 148 are provided with a transversely disposed pin 150 which engages the cam grooves 142 of adjacent magnet jackets on opposite sides of an actuating rod. It, therefore, will be appreciated that upon longituinally translating the actuating rods 148, as by a gear 152, one of which is shown, operated by a manual crank, for instance, that the movement of the pins 150 within the cam groove 142 will raise or lower the magnet members 136 relative to the support plate 32 depending on direction of movement of the actuating rods 148. It will be understood that the actuating rods and pins coacting with the opposite sides of a common magnet must be simultaneously translated to produce the desired movement of the magnets.

FIGS. 14 and 15 illustrate yet another embodiment of the invention wherein magnets may be moved relative to a support plate. In this embodiment the two piece support plate 154 is provided with a plurality of holes 156 receiving magnet members 158 encompassed in jackets 160. The support plate 154 is defined with a plurality of recesses 162, FIG. 15, which communicate with a portion of the jackets 160. The jacket portions within recesses 162 have diametrically opposed pivot pins 164 extending from the jackets for a cooperation with link members 166 having bifurcated ends 168. A plurality of cam shafts 170 are rotatably mounted within the support plate 154 having eccentric portions 172 which are received within the bifurcated link ends 168. Thus, upon a cam shaft 170 being rotated in a direction to lower one end of the links 166, the magnets associated with links engaging the rotated cam shaft will be moved through half of their vertical downward movement. Rotation of the adjacent cam shaft, located on the opposite side of the magnet row, will fully retract the magnets of a row. This embodiment of magnet actuation is of advantage in that it permits only one cam shaft at a time to be rotated and, thus, will control only two rows of magnets at a time.

A further embodiment of the invention showing means for raising and lowering the magnet member 173 relative to the support surface is illustrated in FIG. 16. In this embodiment the support plate 174 may be formed of three portions, 176, 178, and 180. Portion 176 is bored and recessed at 182 and provided with a shoulder 184. Portion 178 is provided with a bore 186 and a portion 180 may be recessed as at 188. An annular guide and seal ring 190 may be located within the recess 182, and an O ring 192 may be located within a groove within the ring. The magnet jacket is in the form of a piston 194 having an enlarged head circumscribed by a groove receiving the O ring 196 which sealingly engages the bore 186. The magnet 173 forms a fixed part of the piston and is provided with a pole surface 198 which, when the piston is in the up position, FIG. 16, will substantially align with the support plate surface 200. The magnet jacket is beveled as at 202 for communication with a fluid conduit 204. Likewise, the recess 188 partially defines a chamber in communication with a conduit 206. The conduits 204 and 206 are defined in the support plate and are preferably supplied with pressurized air or fluid from suitable pressure and valve means wherein a magnet jacket piston may be selectively raised in the up position as illustrated, or downwardly depending on which conduit is pressurized and which is in communication with exhaust. It will be appreciated that by connecting the conduits in any desired manner any number of magnet members may be caused to operate simultaneously.

FIGS. 17 through 21 illustrate apparatus, in accord with the invention, which is particularly adaptable with a printing chase used in the printing of signature sheets employed in bookmaking. However, this embodiment is not limited to such application and chases employing similar structure and concepts may be employed in the printing of single pages or forms.

The chase of FIG. 17 consists of support plate 208 which may be clamped to the printing press in the normal chase manner. The plate 208 is provided with a plurality of holes into which jacketed magnet members 210 are press fitted such that a pole surface thereof substantially aligns with the support surface 212 of the plate 208. In this embodiment there is no relative movement between the magnet members and the support plate.

The support plate is provided with a plurality of parallel grooves 214 which are evenly spaced thereon for receiving the type mounting element lifting tool as will be later described. The support plate 208 is also provided with a plurality of bores 216 opening into the underside of the support plate, FIG. 18, for receiving spring biased locating members 218. The bore 216 is provided with a shoulder 220 and the locating member is of cylindrical configuration having a shoulder at 222 for cooperation with the shoulder 220 and a shoulder 224 defined by a reduced diameter at 226. A snap ring 228 may be placed within a groove within the bore 216 and serves as an anchor for one end of spring 230 interposed between a washer resting upon the snap ring and the locator member 218 which is, thus, biased upwardly, as shown in FIG. 18. It will be noted that normally the locator will be biased in the upward position wherein shoulder 224 will be located above the support surface 212.

The backing plate 232, of magnetic material such as steel, for the type mounting elements used with the plate 208 is shown in FIG. 12 and is preferably of substantially rectangular configuration. The plates 239 are cemented to the type plate and are provided with spaced holes 234 located adjacent an edge 236 and a hole 238 is located adjacent the opposite edge 240. Each plate 232 will have only one notch 242 defined therein. In the plate illustrated in FIG. 21, 15 dotted line notches 242 are shown to illustrate the location of the notches of a complete set of plates 232 and the hole 238 of each plate will preferably be located at a predetermined location adjacent the edge 240. Thus, the number four type mounting element plate will have only a notch located in the position indicated by number 4, FIG. 21, and the hole 238 for the number 4 element will be located at its predetermined position. The notches 242 are for the purpose of aiding the operator to arrange the type mounting element plates prior to use in that upon resting a stack of the 16 type mounting elements in a set upon the edge 236, the notches 242 will define a diagonally extending groove along the top of the elements if the proper sequence is present. Each of the plates 232 may be provided with a notch 244 on one of the lateral edges to indicate that each of the plates is uniformly oriented.

The locator members 218 are so positioned upon the support plate 208 that the type mounting elements 246 cannot be improperly located upon the support plate. This is accomplished by aligning the holes 234 and 238 of each type mounting element plate 232 with the three locator pins constituting the set for a given plate. The holes 234 and 238 are of such size as to receive the reduced diameter 226 of the pins and the plates 232 will rest upon the locator shoulders 224 above the support surface 212, FIG. 18. As shown in FIG. 17, the locator members 218' are those which are received within the prepositioned holes 238 and it is necessary that sixteen of these locator members be employed in the printing of both sides of a signature. It will be appreciated that as only eight type mounting elements may be mounted upon the chase at a time, that the eight plates constituting one side of the signature are first printed and then the second eight plates are placed upon the chase and the reverse side of the signature is printed.

FIG. 17 illustrates two type mounting elements in position wherein the holes 234 receive the locator members 218 and the holes 238 are mated with and receive the locator members 218'. As each type mounting element 246 is located upon the proper locator member set consisting of two members 218 and one member 218', the operator may push downwardly upon the type mounting element, compressing springs 230, to engage the type mounting element plate 232 with the support surface 212 of the support plate. In so doing the magnetic force of the magnets 210 acting upon the plates will maintain the type mounting elements in intimate engagement with the chase support surface. After all eight of the type mounting elements are in position on the support surface, the press may be started and the printing accomplished. It will be appreciated that the reduced locator member portions 226 do not extend through the support plates to an extent which will interfere with the printing.

When it is desired to remove the type mounting elements 246 from the chase, the operator employs a tool 248 such as that shown in FIGS. 19 and 20 having a handle and three pry shoulders 250 defined on the hooked ends 252 which may be received within the grooves. Taking a single tool 248, or a tool in each hand, the operator places the hooked ends 252 of the tool under the longitudinal edges of a plate 232 and pries the edges of the type mounting element plate upwardly, thereby lifting the plate from the support surface 212 and breaking the magnetic flux passing through the support plate. Once the type elements 246 are slightly lifted from the support plate surface, the springs 230 of the locator members are sufficient to maintain the plates removed from the support plate surface and the operator may then lift the type mounting element plates from the locators.

It will be appreciated that the apparatus illustrated in FIGS. 17 through 21 permits the type mounting element plates used in the printing of a book, signatures, or directories, to be very quickly positioned upon the chase and maintained thereon. Also, the possibility of mistakenly locating the type for a particular page upon the chase is eliminated due to the predetermined location of the holes 238 in cooperation with the locator members 218'.

It is understood that it is within the scope of the invention to substitute electromagnets for the permanent magnets disclosed. Permanent magnets are preferred due to the safety features as there will be no loss of type element holding forces in the event of an electrical power failure. Also, while apparatus for printing an eight page signature is shown, the invention may be used with signatures of all sizes and numbers of pages. When sixteen, thirty-two or sixty-four type elements are mounted on a chase at a time, the key function of hole 238 can be practicably expanded by using two holes 238 in each plate 232 and two locator members 218' for each type element.

From the foregoing description, it will be appreciated that the invention provides a very flexible versatile chase for maintaining magnetic type mounting elements in location upon a printing press, and it is to be understood that modifications to the described embodiments may be apparent to those skilled in the art without departing from the spirit and scope of the invention, and it is intended that the invention be defined only by the following claims.

I claim:

1. A chase for use with printing apparatus employing a magnetic type mounting element comprising, in combination, a frame member adapted to be clamped to the printing apparatus, a support surface plate mounted upon said frame member having a support surface for the type mounting element supported thereon, magnet members mounted within said plate having pole surfaces defined thereon selectively disposed adjacent said support surface and means operatively interposed between said surface plate and magnet members permitting relatively rectilinear displacement therebetween in a direction perpendicular to said support surface.

2. In a printing chase as in claim 1, wherein said surface plate is movably mounted upon said frame member and said magnets are fixed relative to said frame member and lifting means interposed between said plate and frame member adapted to lift said plate relative to the frame member and magnet members.

3. In a printing chase as in claim 2, wherein a plurality of parallel cam shafts are interposed between said plate and frame member and said means for rotating said cam shafts comprises a manually operable key actuator member simultaneously engageable with all of said cam shafts.

4. In a printing chase as in claim 1, wherein said surface plate is fixed with respect to said frame member and means movably supporting said magnet members selectively bodily moving said magnet members toward and away from said support surface and relative to said frame member and plate.

5. A positioning and holding device for printing apparatus employing a magnetic type mounting element comprising, in combination, a surface plate defining a type element support surface adapted to be mounted upon the printing apparatus, a plurality of openings defined in said plate intersecting said support surface, magnets within said openings, said magnets each including a pole surface aligning with said support surface during printing and operating means selectively producing relative displacement between said support plate and magnets in a direction perpendicular to said support surface for releasing the type mounting element from said support surface.

6. A type support member for printing apparatus employing a magnetic type mounting element having a bottom surface comprising, in combination, a plate having a type element supporting surface defined thereon, a plurality of openings defined in said plate and intersecting said supporting surface, a magnet mounted in each of said openings having magnetic flux conducting pole portions aligned with said plate supporting surface, at least one recess defined in said plate intersecting said support surface and adjacent said magnets adapted to receive type element lifting means, type element locating means mounted in said plate for movement perpendicular to said support surface, shoulder means defined on said locating means adapted to abuttingly engage the type element bottom surface, and means biasing said locating means away from said supporting surface whereby said locating means may selectively support the type element spaced from said supporting surface facilitating initially locating the type element relative to said supporting surface prior to engagement therewith and holding the type element removed from said support surface after being lifted therefrom.

7. A positioning and holding device for printing as in claim 5, wherein said operating means includes a cam surface defined on each of said magnet members, cam means operatively associated with said cam surfaces and actuating means operatively associated with said cam means.

8. A positioning and holding device for printing as in claim 5, wherein said operating means includes link members mounted on said magnet members, cam means rotatably supported adjacent said magnet members, said link members operatively associating with said cam means and cam actuating means operably associated with said cam means.

9. A positioning and holding device for printing as in claim 5, wherein said operating means includes expansible motor means associated with each of said magnet members having a movable piston member, said piston member being operatively associated with said magnet members.

10. A type support system for printing apparatus comprising, in combination, a set of magnetic type mounting elements having bottom surfaces, a plate having a type mounting element supporting surface defined thereon, a plurality of magnet members mounted on said plate having pole surfaces aligned with said support surface, a plurality of locator members mounted in said plate for movement perpendicular to said supporting surface, a predetermined number of said locator members constituting a common type mounting element aligning set, said locator members defining a plurality of common type mounting element aligning sets, means biasing each of said locator members away from said surface and abutment means defined thereon adapted to abut the type element bottom surfaces and selectively maintain a type mounting element spaced from said support surface thereby facilitating initially locating the type element relative to said supporting surface prior to engagement therewith and holding the type element removed from said support surface after being lifted therefrom, and means defined upon said type mounting elements operatively mating with the locator members of an aligning set, the spacing between the locator members of separate aligning sets and the mating means of the type mounting elements varying whereby only one of said aligning sets will properly receive a predetermined type mounting element.

References Cited by the Examiner

UNITED STATES PATENTS

| | | | |
|---|---|---|---|
| 564,624 | 7/96 | Keller | 101—386 |
| 1,214,216 | 1/17 | Pippert | 101—386 |
| 1,527,299 | 2/25 | Hacker | 101—426 |
| 2,064,284 | 12/36 | Wulf | 101—382 |
| 2,277,405 | 3/42 | McKierman | 101—426 |
| 2,471,067 | 5/49 | Hitchcock | 317—159 |
| 2,599,047 | 6/52 | Clark | 317—159 |
| 2,798,417 | 7/57 | Baumgartner | 101—382 |
| 2,869,047 | 1/59 | Smit et al. | 317—159 |
| 2,918,610 | 12/59 | Briggs | 317—159 |
| 3,017,545 | 1/62 | Meier | 317—159 |

ROBERT E. PULFREY, *Primary Examiner.*

R. A. LEIGHEY, EUGENE R. CAPOZIO, *Examiners.*